(12) United States Patent
Kallio et al.

(10) Patent No.: US 8,902,228 B2
(45) Date of Patent: Dec. 2, 2014

(54) OPTIMIZING RESOLVE PERFORMANCE WITH TILING GRAPHICS ARCHITECTURES

(75) Inventors: Kiia Kaappoo Kallio, Inkoo (FI); Petri Olavi Nordlund, Lieto (FI)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 13/236,403

(22) Filed: Sep. 19, 2011

(65) Prior Publication Data

US 2013/0069943 A1 Mar. 21, 2013

(51) Int. Cl.
G06T 17/20 (2006.01)
G06T 15/00 (2011.01)

(52) U.S. Cl.
CPC .................................. G06T 15/005 (2013.01)
USPC ........................................................ 345/420

(58) Field of Classification Search
USPC ........................................................ 345/420
See application file for complete search history.

(56) References Cited

U.S. PATENT DOCUMENTS

| | | | |
|---|---|---|---|
| 5,923,338 A | 7/1999 | Rich | |
| 5,949,428 A | 9/1999 | Toelle et al. | |
| 6,259,461 B1 | 7/2001 | Brown | |
| 6,380,935 B1 | 4/2002 | Heeschen et al. | |
| 6,684,255 B1 | 1/2004 | Martin | |
| 7,023,437 B1 | 4/2006 | Voorhies et al. | |
| 7,385,608 B1 | 6/2008 | Baldwin | |
| 7,388,581 B1 * | 6/2008 | Diard et al. | 345/421 |
| 7,468,726 B1 | 12/2008 | Wloka et al. | |
| 2002/0196252 A1 | 12/2002 | Liao et al. | |
| 2007/0146378 A1 * | 6/2007 | Sorgard et al. | 345/581 |
| 2007/0171222 A1 | 7/2007 | Kowalski | |
| 2008/0100627 A1 | 5/2008 | Nystad et al. | |
| 2008/0150949 A1 | 6/2008 | Wei et al. | |
| 2009/0066694 A1 | 3/2009 | Redshaw et al. | |
| 2009/0091569 A1 | 4/2009 | Nordlund et al. | |
| 2010/0007662 A1 | 1/2010 | Cox et al. | |
| 2010/0177105 A1 | 7/2010 | Nystad et al. | |
| 2010/0231588 A1 | 9/2010 | Barczak | |
| 2011/0221743 A1 * | 9/2011 | Keall et al. | 345/419 |
| 2012/0206455 A1 * | 8/2012 | Shreiner | 345/420 |
| 2013/0241938 A1 | 9/2013 | Gruber et al. | |

FOREIGN PATENT DOCUMENTS

EP 1901234 A2 3/2008

OTHER PUBLICATIONS

Antochi, "Suitability of Tile-Based Rendering for Low-Power 3D Graphics Accelerators," Dissertation—University Politehnica Bucharest, Oct. 29, 2007, 163 pp.
Liang et al., "Index Rendering: Hardware-Efficient Architecture for 3-D Graphics in Multimedia System," IEEE Transactions on Multimedia, vol. 4, No. 2, Jun. 2002, pp. 343-360.

(Continued)

Primary Examiner — David Zarka
Assistant Examiner — Richard M Russell
(74) Attorney, Agent, or Firm — Shumaker & Sieffert, P.A.

(57) ABSTRACT

Aspects of the disclosure relate to a method of processing graphics that includes organizing graphics data into a plurality of polygons and assigning to each of the polygons a polygon index value that indicates an order in which each polygon will be rendered. The method also includes associating pixels of graphics data with one of the polygon index values and determining when the pixels of graphics data will finish rendering based at least partially on the association of the pixels to the one of the polygon index values. The method also includes resolving the pixels of video data based on the determination.

40 Claims, 7 Drawing Sheets

(56) References Cited

OTHER PUBLICATIONS

Oat Christopher, "Efficient Spatial Binning on the GPU-Parallel Computing for Graphics: Beyond Programmable Shading", SIGGRAPH ASIA 2008, Dec. 12, 2008, pp. 28.

Ribble Maurice, "Next-Gen: Tile-Based GPUs", Game developers conference mobile'08, San Francisco, Feb. 18-22, 2008, pp. 36.

Ton Son, "Tap into the Source: Enhancing 3D Apps on Snapdragon", QDevNet Newsletter, Qualcomm Incorporated, Sep. 2011, pp. 6.

Witheiler Matthew, "STMicroelectronics Kyro II 64MB", AnandTech, Mar. 31, 2001, pp. 17.

Cheng et al., "Using mobile GPU for general-purpose computing—a case study of face recognition on smartphones," International Symposium on VLSI Design, Automation and Test (VLSI-DAT), IEEE, Apr. 25, 2011, 4 pp.

Hsiao et al., "A Hierarchical Primitive Lists Structure for Tile-Based Rendering," International Conference on Computational Science and Engineering, IEEE, Piscataway, NJ, USA, Aug. 29, 2009 pp. 408-413.

International Search Report and Written Opinion—PCT/US2012/050163—ISA/EPO—Nov. 21, 2012, 12 pp.

Kim et al., "A Memory-Efficient Unified Early Z-Test," IEEE Transactions on Visualizaton and Computer Graphics, vol. 17, No. 9, Sep. 2011, pp. 1286-1294.

Xiao et al., "A analysis of mobile graphics pipeline with real-time performance," Audio Language and Image Processing (ICALIP), 2010 International Conference on, IEEE, Piscataway, NJ, USA, Nov. 23, 2010, pp. 489-493.

Reply to Written Opinion dated Nov. 21, 2012, from international application No. PCT/US2012/050163, filed Aug. 9, 2013, 11 pp.

Second Written Opinion from international application No. PCT/US2012/050163, dated Sep. 24, 2013, 8 pp.

Mao Z., et al., "TOIGP: A New Hierarchical Depth Occlusion", VRCIA '06 Proceedings of the 2006 ACM international conference on Virtual reality continuum and its applications, ACM New York, Jun. 14-17, 2006, pp. 197-203.

International Preliminary Report on Patentability from corresponding PCT Application Serial No. PCT/US2012/050163 dated Jan. 9, 2014 (26 pages).

* cited by examiner

120

| | 0,0 | 1,0 | 2,0 ... | | | | |
|---|---|---|---|---|---|---|---|
| | 1 | 2 | 2 | 57 | 2 | 2 | 3 | 3 |
| 0,1 | 56 | 56 | 2 | 57 | 57 | 8 | 8 | 8 |
| 0,2 | 56 | 56 | 57 | 57 | 57 | 53 | 53 | 8 |
| ⋮ | 56 | 57 | 57 | 53 | 53 | 53 | 51 | 10 |
| | 53 | 53 | 53 | 51 | 51 | 51 | 51 | 16 |
| | 51 | 51 | 51 | 51 | 47 | 47 | 18 | 26 |
| | 12 | 12 | 12 | 12 | 3 | 4 | 18 | 41 |
| | 12 | 1 | 3 | 4 | 4 | 5 | 20 | 24 |

FIG. 5

OPTIMIZING RESOLVE PERFORMANCE WITH TILING GRAPHICS ARCHITECTURES

TECHNICAL FIELD

Aspects of the disclosure relate to graphics processing.

BACKGROUND

Graphics processing units (GPUs) are commonly implemented to render three-dimensional (3D) graphics content for presentation on a two-dimensional visual display. For example, a GPU may be implemented to render pixels that are representative of 3D content on a display. The GPU may perform graphics processing to generate pixel values for each pixel of the display when rendering a scene.

Some GPUs may render an entire scene at one time. Alternatively, a GPU may render graphics in smaller portions of a scene, often referred to as "tiles" of a scene. For example, a GPU may subdivide a scene into a plurality of tiles, and individually render each of the tiles. The GPU may then reconstruct the scene by combining each of the rendered tiles. Tiles may be sized so that the data associated with a particular tile can be stored in local GPU memory resources during rendering.

SUMMARY

In general, this disclosure describes techniques for interleaving GPU processes to increase shader core utilization. This disclosure describes techniques for interleaving a rendering process and a resolve process of a GPU. That is, rather than rendering and resolving an entire scene or tile of pixel data, techniques of this disclosure relate to interleaving the rendering process and the resolve process, such that the GPU can resolve one or more pixels of data independently from rendering the one or more pixels of data. In addition, this disclosure describes techniques for interleaving a rendering process and an unresolve/clear process of a GPU. That is, rather than unresolving or clearing an entire scene or tile of pixel data, techniques of this disclosure relate to interleaving the unresolve/clear process and the rendering process, such that the GPU can unresolve or clear one or more pixels of data immediately following the resolve process, while also rendering other pixels of data.

In an example, aspects of the disclosure are directed to a method of processing graphics. The method includes organizing graphics data into a plurality of polygons, and assigning to each of the polygons a polygon index value that indicates an order in which each polygon will be rendered. The method also includes associating pixels of graphics data with one of the polygon index values, and determining when the pixels of graphics data will finish rendering based at least partially on the association of the pixels to the one of the polygon index values. The method also includes resolving the pixels of video data based on the determination.

In another example, aspects of the disclosure are directed to an apparatus for processing graphics. The apparatus includes one or more processors configured to organize graphics data into a plurality of polygons; assign to each of the polygons a polygon index value that indicates an order in which each polygon will be rendered; associate pixels of graphics data with one of the polygon index values; determine when the pixels of graphics data will finish rendering based at least partially on the association of the pixels to the one of the polygon index values; and resolve the pixels of video data based on the determination.

In another example, aspects of the disclosure are directed to an apparatus for processing graphics that includes a means for organizing graphics data into a plurality of polygons, and a means for assigning to each of the polygons a polygon index value that indicates an order in which each polygon will be rendered. The apparatus also includes a means for associating pixels of graphics data with one of the polygon index values, and a means for determining when the pixels of graphics data will finish rendering based at least partially on the association of the pixels to the one of the polygon index values. The apparatus also includes a means for resolving the pixels of video data based on the determination.

In another example, aspects of the disclosure are directed to a computer program product comprising a computer-readable medium having stored thereon instructions that, when executed, cause one or more processors to organize graphics data into a plurality of polygons; assign to each of the polygons a polygon index value that indicates an order in which each polygon will be rendered; associate pixels of graphics data with one of the polygon index values; determine when the pixels of graphics data will finish rendering based at least partially on the association of the pixels to the one of the polygon index values; and resolve the pixels of video data based on the determination.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5 is a block diagram illustrating a table of index values that are associated with the blocks show in FIGS. 3 and 4, according to aspects of the disclosure.

DETAILED DESCRIPTION

Figure 1:
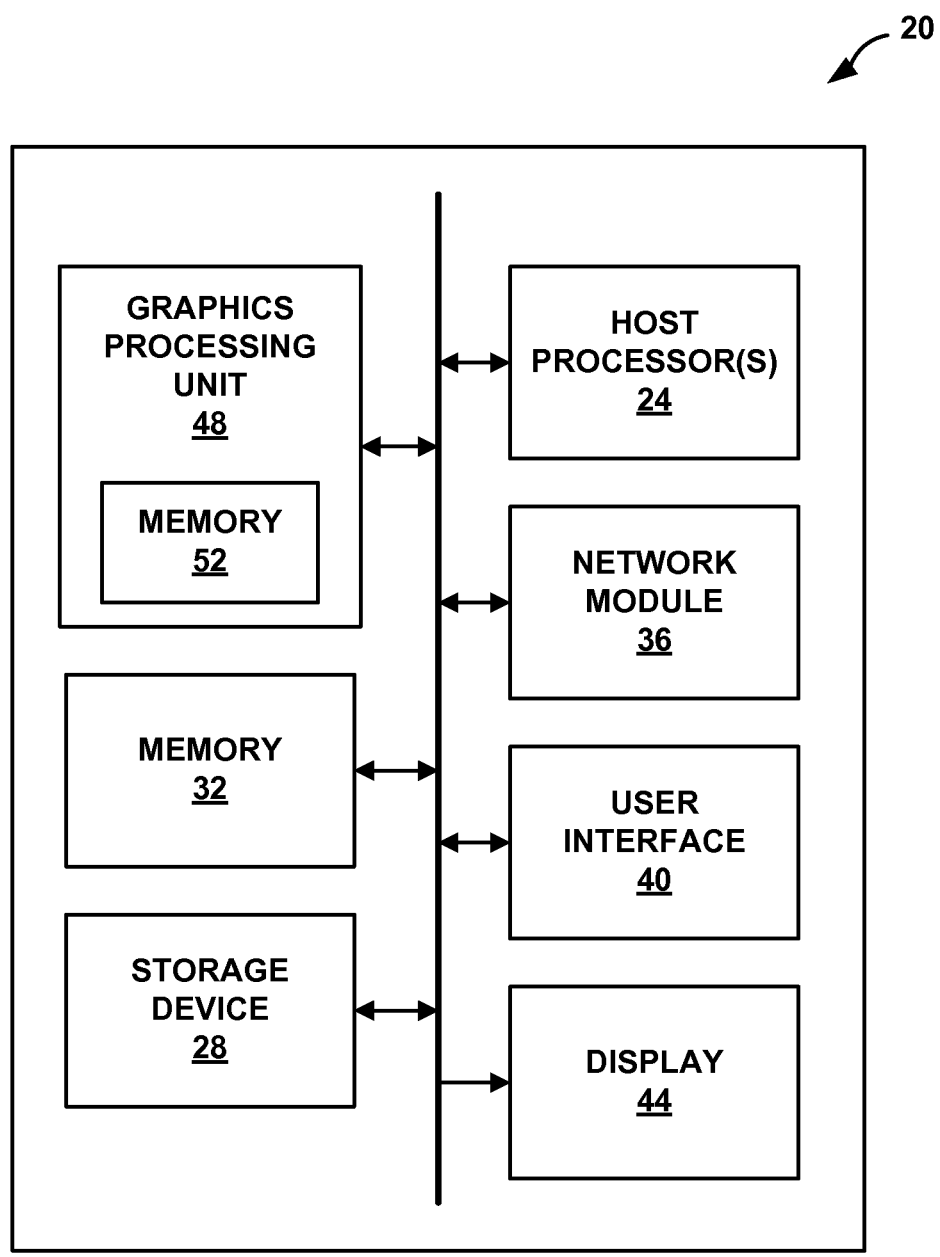
FIG. 1 is a block diagram illustrating a computing device that may implement techniques for interleaving processes of a GPU, according to aspects of the disclosure.

In general, this disclosure describes techniques for increasing efficiency of a graphics processing unit (GPU), which in some examples, implements a tile-based rendering architecture. Aspects of the disclosure include techniques for interleaving GPU processes to increase shader core utilization. More specifically, this disclosure describes techniques for interleaving a rendering process and a resolve process of a GPU. In some examples, the GPU may group pixel data into blocks (e.g., a 4×4 block of pixels, an 8×8 block of pixels, a 16×16 block of pixels, and the like), and the GPU may render some blocks of pixel data while resolving other blocks of pixel data. Accordingly, rather than rendering and resolving an entire scene or tile of pixel data, techniques of this disclosure relate to interleaving the rendering process and the resolve process in time, such that the GPU can resolve one or more blocks of pixel data independently from rendering other blocks of pixels of data.

For purposes of example and explanation, this disclosure describes techniques for a GPU that implements a tile-based rendering architecture. Tile-based rendering techniques typically reduce the need for a GPU to include large amounts of memory. For example, a GPU that implements a traditional rendering architecture may render an entire scene of pixel data (e.g., a frame of video data, a computer-generated graphics image, a still image, and the like), store the scene to GPU memory, and transfer the scene from the GPU memory to an external memory such as a display buffer. Alternatively, a GPU that implements a tile-based architecture may individually render predefined portions (commonly referred to as "tiles") of a scene, store the tiles to a relatively smaller on-chip GPU memory, and transfer the tiles from the GPU memory to an external memory. The tiles can then be assembled in the external memory and displayed as a single scene. While this disclosure describes techniques being carried out by a GPU that implements a tile-based architecture, it should be understood that the techniques may also be carried out by GPUs that implement other architectures, such as the scene-by-scene architecture described above.

Tile-based rendering may be performed in several steps. For example, a GPU implementing a tile-based architecture may initially process, or preprocess, an entire scene during a binning pass to define a number of bins, also referred to as "tiles." The binning pass may be followed by a series of rendering passes, during which each of the defined tiles are rendered. In some examples, each of the rendering passes is completed in three stages: (1) clear/unresolve, (2) render, (3) resolve.

During the binning pass, the GPU may generate polygons (e.g., triangles) that make up a scene and sort the polygons to a plurality of "bins." As described herein, the bins defined during the binning pass may directly relate to tiles of a final scene presented on a display (e.g., sometimes referred to as "screen tiles"). For example, each bin represents a portion, or tile of the final scene (e.g., a predefined portion of a frame of video data, computer-generated graphics image, still image, or the like). Accordingly, the terms "bin" and "tile" may be used herein interchangeably.

In some examples, the GPU also performs operations during the binning pass to determine which of the polygons are visible in the scene, such as performing a depth test to determine whether a polygon covers another polygon. Upon determining which polygons are visible in the scene, the GPU can generate a stream of data referred to as a "visibility stream." The visibility stream may include a value for each of the polygons of the scene, and the value may represent whether the polygon is visible (e.g., a value of "1" may indicate that the polygon is visible and a value of "0" may indicate that the polygon is not visible).

After binning, the GPU may separately render each of the tiles by processing each of the tiles again. In some examples, the GPU implements the visibility stream generated during binning to omit, or skip, invisible polygons, so that the invisible polygons are not rendered. Accordingly, only the visible polygons, i.e., those polygons that contribute to the final scene, are processed and rendered. The GPU may carry out the rendering process on each of the tiles in three stages: (1) clear/unresolve, (2) rendering, and (3) resolve.

During the clear/unresolve stage, the GPU may initialize local memory resources (e.g., on-chip GPU memory) for a new tile. In some examples, the GPU initializes the GPU memory by performing a clear process to clear the GPU memory. In other examples, the GPU may initialize the GPU memory by performing an unresolve process. During an unresolve process, the GPU may read values into the GPU memory from an external memory. The GPU may implement the unresolve process when only a portion of a scene is being updated with new data. For example, pixel data that is not changed from one scene to another may be preserved across more than one scene (e.g., more than one frame of graphics data) using the unresolve process.

During rendering, the GPU may recreate the polygons associated with a current tile, as well as generate pixel values and finish a current tile, such that the tile can be displayed on a display. For example, the GPU may generate the appropriate pixel values during the rendering stage so that the pixel data that is displayed accurately represents the scene. In some examples, the GPU may store the final pixel values in the on-chip GPU memory.

After rendering, the GPU may resolve the current tile by copying the contents of the on-chip memory to a memory external to the GPU, such as a buffer for used by a display in displaying finished scenes. The GPU must typically wait to resolve pixel data until the pixel data has finished rendering. For example, if the GPU resolves, or copies, pixel data from GPU memory to external memory before the pixels have been fully rendered, the resulting scene will not exhibit the appropriate attributes of the intended scene when displayed.

In some examples, the GPU may wait to resolve a tile until the entire tile has finished rendering. For example, the GPU may wait until an entire tile is ready for display before copying the tile from GPU memory to an external memory. The GPU repeats the process until the entire scene is finished by clearing/unresolving GPU memory for the next tile, rendering the next tile, and resolving the next tile.

This disclosure describes techniques for resolving pixel data after rendering the pixel data, without waiting for an entire tile to finish rendering, i.e., without waiting for pixel data to be rendered for all polygons in the tile. According to some aspects of the disclosure, the GPU may group pixels into "blocks" of pixel data (e.g., a 4×4 block of pixels, an 8×8 block of pixels, a 16×16 block of pixels, and the like) and resolve the blocks of pixels after rendering the blocks of pixel data, without waiting for an entire tile to finish rendering.

To help to ensure that blocks of pixels are fully rendered prior to being resolved, techniques of the disclosure relate to implementing a polygon indexing system. For example, a GPU may perform polygon indexing during the binning process to track when each of the visible polygons of a scene will be rendered. That is, the GPU may apply polygon index values to the visible polygons of a tile according to an order in which the polygons will be rendered. According to some aspects of the disclosure, the polygon index values can be associated with, or tied to, blocks of pixels. For example, the GPU may assign a polygon index value to a block of pixels each time a polygon is generated in the block. The last polygon index value to be assigned to the block, then, is the last polygon to be rendered in the block.

The GPU may reference the polygon index value again during rendering. For example, the GPU may maintain a rolling counter for each polygon that is rendered in a tile. Upon generating a current polygon, the GPU can compare the counter value for the current polygon to the polygon index value for each block of pixels that the polygon "touches" (e.g., each block of pixels that will be used to display the polygon in the final scene). If the counter for the current polygon matches a polygon index value associated with a relevant block, the relevant block will be finished after the GPU renders the current triangle. For example, because the current triangle is the last triangle to be rendered in the block, no additional data will later be rendered in the block. Accordingly, the GPU can resolve the matching blocks after rendering the current triangle, without waiting for the rest of the tile to finish rendering.

Techniques of the disclosure relate to polygon indexing during the binning process. For example, in addition to determining which polygons are visible in the scene and generating the visibility stream, techniques of the disclosure include assigning an index number to each of the visible polygons of a scene during binning According to some aspects of the disclosure, the polygon indexing is performed according to an order in which the polygons are rasterized (e.g., during which the pixels of the polygons are initially generated), because the order in which the polygons are rasterized dictates the order in which the GPU will render the polygons. For example, the GPU may render the polygons (e.g., during which final pixel values are generated and blended for display) in the same order that the GPU rasterizes the polygons. Accordingly, by implementing polygon indexing after the rasterizing process, the GPU can track the order in which the polygons are rendered.

In addition to performing polygon indexing during the binning process, techniques of the disclosure relate to associating polygon index values with blocks of pixel data (e.g., 4×4 blocks of pixels, 8×8 blocks of pixel, 16×16 blocks of pixels, and the like). For example, according to some aspects of the disclosure, a GPU may associate polygon index values of the polygons with the blocks of pixels as the polygons are generated (e.g., rasterized) during the binning process. Accordingly, the GPU may associate the polygon index value of the last polygon to be rendered in a particular block with that particular block. Thus, the polygon index number associated with a particular block will be highest polygon index number associated with a polygon that is rendered in the particular block.

In some examples, the GPU may implement a block buffer to store the polygon index values that are associated with blocks. For example, the GPU may implement a block buffer that includes an entry for each block of pixels in a scene. The GPU may store the index value of the last polygon that will be rendered in a particular block to the appropriate corresponding location in the block buffer. According to some examples, the polygon index value stored to the block buffer may be referred to as a "block index value," where the block index value is equivalent to the polygon index value of the last polygon that will be rendered in a block.

This disclosure describes techniques for utilizing polygon index values associated with blocks of pixels during a rendering process to determine when the blocks of pixels will finish rendering. For example, during a rasterization phase of a rendering pass, the GPU may maintain a rolling counter associated with each polygon that is rasterized. The GPU may increment the counter each time the GPU creates a polygon. In addition, the GPU may compare the counter value of a current polygon to the previously generated and stored index value of the last polygon to be rendered in each block that the polygon touches. If the counter value of the current polygon matches the polygon index value stored for that block, the block is ready to be resolved after the current polygon has been rendered. For example, no additional pixel data will be rendered to the block, because the current polygon is the last polygon that contributes to the block.

According to some aspects of the disclosure, the GPU may resolve a block of pixels as soon as the GPU determines that no additional pixel data will be written to the block of pixels. For example, upon determining that a rolling polygon counter of a current polygon matches the polygon index value associated with a particular block, the GPU may resolve the block immediately after rendering the current polygon.

In some examples, the GPU may resolve the blocks of a scene by implementing a resolve queue and a resolve unit. According to some aspects, the GPU may track blocks that are ready to be resolved in a resolve queue according to block identifiers. For example, the GPU may generate a position value, or block identifier value, associated with each block of a given tile. The GPU may identify each block of a given tile by assigning each block an identifier value based on the spatial location of the block in the tile.

In one example, each block may be identified by its 2-D coordinate, e.g., (x, y) in Cartesian coordinates. For example, the block located at the top-left corner of the tile may be identified as the block located at (0, 0). The block immediately to the right of the block located at (0, 0) may be identified as the block located at (1, 0). The block immediately below the block located at (0, 0) may be identified as the block located at (0, 1). The Cartesian coordinates described above are described for illustration purposes only, and the positions of the blocks may be identifiable in other ways with other coordinate systems (e.g., polar coordinates, bipolar coordinates, parabolic coordinates, offsets, and the like).

Upon matching the counter value with the stored polygon index value of a particular block, the GPU may signal that the block is ready to be resolved by writing the block identifier value to the resolve queue. The resolve queue may be large enough to store all of the identifier values of all of the blocks of a tile. Accordingly, the resolve queue may store the order in which each of the blocks of a given tile should be resolved.

According to some aspects of the disclosure, the resolve unit may read the resolve queue and perform the resolving of the blocks (e.g., copy the pixel data associated with the blocks from GPU memory to an external memory). In some examples, the resolve unit resolves the blocks according to the position of the block's identifier value in the resolve queue. For example, the resolve queue may be a first-in-first-out ("FIFO") type register, such that the first block identifier stored in the resolve queue (which corresponds with the first block that is ready to be resolved) is also the first block identifier value read by the resolve unit. The resolve unit may operate asynchronously from rendering. For example, the resolve unit can read values stored in the resolve queue and resolve blocks of pixel data at any time during rendering.

By implementing the polygon indexing system, a GPU can determine when pixels, or blocks of pixels, have finished rendering. Accordingly, the GPU can resolve pixels as soon as they are finished rendering and ready to be displayed, e.g., as soon as no additional information is going to be written to the block. The GPU does not have to wait for an entire tile to finish rendering before resolving the tile.

By resolving smaller blocks of data, rather than waiting for an entire tile of pixels to finish rendering, shader core utilization and overall GPU efficiency can be increased. GPU efficiecy is generally maximized when the processing units, referred to as shader core(s), are processing pixel data. Large data transfers, such as data transfers between GPU memory and an external memory, may slow the overall performance of the GPU, because the shader cores may be idle during data transfer.

For example, a GPU that implements a traditional rendering architecture may clear or unresolve on-chip GPU memory, render an entire tile of pixel data, store the tile to on-chip GPU memory, and transfer the entire tile from the GPU memory to an external memory such as a display buffer.

During the time that the GPU is clearing/unresolving GPU memory and again when transferring data from GPU memory to external memory (e.g., resolving), the shader cores sit idle. Due to memory bus constraints between GPU memory and external memory, there may be considerable latency associated with data transfers, leading to large shader core idle times.

As described in this disclosure, resolving pixel data on a block-by-block basis, independently of the rendering process, may improve utilization of the shader cores. For example, the shader cores of the GPU may be rendering data of a tile while at the same time resolving data of that tile to external memory. By implementing the polygon indexing techniques described in this disclosure, a GPU may interleave the process of resolving data with the process of rendering data, thereby increasing the utilization of the shader cores. For example, the shader cores may have less idle time because it is not necessary to for the shader cores to stand idle waiting for an entire tile to be transferred to external memory. Instead, the shader cores may continue to process other portions of a tile while previously processed portions are transferred to external memory.

In addition to interleaving the rendering and resolving processes, techniques of this disclosure relate to improving the unresolve/clear process. For example, after the GPU has resolved pixel data (e.g., written data from on-chip GPU memory to external memory) the GPU can immediately replace the resolved pixel data with new data. The data can be immediately replaced, because pixel data that has been resolved to an external memory, such as a display buffer, will no longer be used by the GPU during a current rendering pass, and if necessary, will be unresolved from external memory back to the GPU memory.

According to some aspects of the disclosure, upon resolving a block of pixel data, the GPU replaces the block of pixel data in on-chip memory by clearing or unresolving the block of pixel data from GPU memory. In some examples, the GPU can clear/unresolve pixel data in blocks, without waiting to clear/unresolve an entire tile of pixel data. In this way, the GPU can interleave the clear/unresolve process with the rendering process, thereby increasing shader core utilization. For example, the GPU can render pixel data using the shader cores while simultaneously clearing/unresolving data from GPU memory.

Techniques of the disclosure also relate to further modifying the unresolve/clear process and/or rendering process such that, in some cases, the GPU may not perform the clear/unresolve process and/or rendering process. For example, according to some aspects of this disclosure, a GPU may maintain a second block buffer that stores a polygon index value of a final polygon that touches the block (e.g., the final polygon that will be rendered in a particular block of pixels) and fully covers the block (e.g., the polygon is opaque and is rendered in all of the pixels of the particular block). For example, the GPU may generate a polygon index value in the same manner as that described above, but may only store the polygon index value to the second block buffer if the polygon is the final polygon that will be rendered in a particular block and fully covers the block (e.g., pixels from other polygons rendered later than this polygon in the same rendering pass do not contribute to the block).

Using this second block buffer, the GPU may identify blocks that do not need to be cleared/unresolved during the rendering process. For example, as noted above, the GPU may initially clear or unresolve the contents of GPU memory during a rendering pass. According to aspects of the disclosure, prior to unresolving the contents of GPU memory when rendering a particular polygon, the GPU may compare the polygon index value of the current polygon to the polygon index value stored in the second block buffer. If the index value of the current polygon is less than the polygon index value stored in the second block buffer (e.g., if such a value has been stored), it is known that the current polygon will be overwritten later. That is, it is known that there is a polygon that fully covers the block and that will be rendered later in the rendering pass (e.g., and thus, has a higher polygon index value), which will eliminate/overwrite any contribution from the current polygon. Accordingly, the GPU may skip the unresolve process if the contents will be overwritten later. In this way, the GPU may only unresolve blocks that do not have a polygon that fully covers the block, but still have polygons that touch the blocks.

Additionally or alternatively, the GPU may refrain from rendering certain polygons based on the polygon index value stored in the second block buffer. For example, GPU may refrain from rendering polygons that will be overwritten later during the rendering pass. That is, when a polygon index value is stored in the second block buffer, GPU may refrain from rendering polygons associated with a lower polygon index value than the polygon index value stored in the second block buffer. GPU may refrain from rendering such polygons, because it is known that the polygon associated with the polygon index value stored in the second block buffer will overwrite such polygons.

While certain aspects above are described with respect to a "second block buffer," it should be understood that in another example the polygon index value described with respect to the second block buffer may be stored in a common block buffer with the other polygon index value described above. In this example, a first polygon index value may be maintained separately from a second polygon index value in the common buffer.

FIG. 1 is a block diagram illustrating a computing device 20 that may implement techniques for improving GPU efficiency by interleaving certain processes of a GPU, according to aspects of the disclosure. As shown in FIG. 1, computing device 20 includes a host processor 24, a storage device 28, a memory 32, a network module 36, a user interface 40, and a display 44. Computing device 20 also includes a graphics processing unit (GPU) 48. Computing device 20 may, in some examples, include or be a part of a portable or mobile computing device (e.g. mobile phone, netbook, laptop, tablet device, digital media player, gaming device, or other portable computing device). Alternatively, computing device 20 may be configured as a stationary computing device, such as desktop computer, server, television, television set-top box, gaming console, or the like.

The illustrated computing device 20 of FIG. 1 is merely one example. Techniques for interleaving processes of a GPU, such as GPU 48, may be carried out by a variety of other computing devices having other components. In some examples, computing device 20 may include additional components not shown in FIG. 1 for purposes of clarity. For example, computing device 20 may include one or more communication bridges for transferring data between components of the computing device 20. Moreover, the components of computing device 20 shown in FIG. 1 may not be necessary in every example of computing device 20. For example, user interface 40 and display 44 may be external to computing device 20 in examples where computing device 20 is a desktop computer.

Host processor 24 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to host processor 24, in this disclosure, may be embodied as software, firmware, hardware or any combination thereof.

Host processor 24 processes instructions for execution within computing device 20. Host processor 24 may be capable of processing instructions stored on storage device 28 or instructions stored in memory 32. Host processor 24 may execute applications that cause viewable content to be displayed on display 44. According to some aspects of the disclosure, and as described in greater detail below with respect to GPU 48, host processor 24 may collaborate with GPU 48 to generate viewable content for display 44. For example, host processor 24 may initialize execution of an application and delegate certain graphics processing functions associated with the application to GPU 48.

Storage device 28 may include one or more computer-readable storage media. Storage device 28 may be configured for long-term storage of information. In some examples, storage device 28 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. Storage device 28 may, in some examples, be considered a non-transitory storage medium. The term "non-transitory" may indicate that the storage medium is not embodied in a carrier wave or a propagated signal. However, the term "non-transitory" should not be interpreted to mean that storage device 28 is non-movable. As one example, storage device 28 may be removed from computing device 20, and moved to another device. As another example, a storage device, substantially similar to storage device 28, may be inserted into computing device 20. Storage device 28 may store instructions for execution of one or more applications by host processor 24 or GPU 48.

Memory 32 may be configured to store information within computing device 20 during operation. In some examples, memory 32 is a temporary memory, meaning that a primary purpose of memory 32 is not long-term storage. Memory 32 may, in some examples, be described as a computer-readable storage medium. Accordingly, memory 32 may also be considered "non-transitory," despite storing data that can change over time. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art.

In some examples, memory 32 may be used to store program instructions for execution by host processor 24 or GPU 48. Memory 32 may be used by software or applications running on computing device 20 to temporarily store information during program execution. As such, memory 32 may be accessed by other components of computing device 20 such as host processor 24 and GPU 48.

According to some aspects of the disclosure, memory 32 may be implemented as a display buffer that stores pixel data (e.g., a frame of video data, a computer-generated graphics image, a still image, and the like) before the data is displayed by display 44. For example, GPU 48 may resolve pixel data to memory 32 before the pixel data is displayed by display 44.

Computing device 20 may utilize network module 36 to communicate with external devices via one or more networks, such as one or more wireless networks. Network module 36 may be a network interface card, such as an Ethernet card, an optical transceiver, a radio frequency transceiver, or any other type of device that can send and receive information. In some examples, computing device 20 may utilize network module 36 to wirelessly communicate with an external device such as a server, mobile phone, or other networked computing device.

Computing device 20 also includes user interface 40. Examples of user interface 40 include, but are not limited to, a trackball, a mouse, a keyboard, and other types of input devices. User interface 40 may also include a touch-sensitive screen that is incorporated as a part of display 44. Display 44 may comprise a liquid crystal display (LCD), an organic light emitting diode (OLED) display, a plasma display, or another type of display device.

GPU 48 of computing device 20 may be a dedicated hardware unit having fixed function and programmable components for rendering graphics and executing GPU applications. GPU 48 may also include a DSP, a general purpose microprocessor, an ASIC, an FPGA, or other equivalent integrated or discrete logic circuitry. GPU 48 may also include other components, such as dedicated GPU memory 52.

In addition, although shown as separate components in FIG. 1, in some examples, GPU 48 may be formed as part of host processor 24. GPU 48 may be configured to utilize processing techniques in accordance with a variety of application programming interfaces (APIs). For example, a user may program an application to be executed by GPU 48 using a standard software interface that can run on multiple platforms, operating systems, and hardware.

In some examples, GPU 48 may be configured to utilize applications generated using the OpenGL platform, including OpenGL for Embedded Systems ("OpenGL ES," released March, 2007 and publically available). In general, an API includes a predetermined, standardized set of commands that are executed by associated hardware. API commands allow a user to instruct hardware components of a GPU to execute commands without user knowledge as to the specifics of the hardware components.

GPU 48 may be implemented to render graphics for display on display 44. According to some aspects of the disclosure, GPU 48 may implement a tile-based rendering architecture. For example, rather than rendering an entire scene of pixel data (e.g., a frame of video data, a computer-generated graphics image, a still image, and the like), GPU 48 may break a scene into multiple pieces (e.g., "tiles"), and individually render the tiles. The GPU 48 may write each of the rendered tiles to a buffer, such as a display buffer included in memory 32. Upon writing all of the tiles of the scene to memory 32, computing device 20 may assemble the rendered tiles and display the scene on display 44.

According to some aspects of the disclosure, GPU 48 may perform tile-based rendering in a plurality of "passes" (e.g., a "pass" may generally refer to processing pixel data). During an initial binning pass, GPU 48 may initially process an entire scene to determine which polygons (e.g., triangles) are visible in the scene (e.g., using depth testing or z-buffering) and assign the polygons to bins that define tiles. The GPU 48 may follow the binning pass with a series of rendering passes, during which the GPU 48 renders each of the tiles. In some examples, each of the rendering passes is completed in three stages: (1) clear/unresolve, (2) render, (3) resolve.

Prior to binning, the GPU 48 may receive data associated with a scene from host processor 24. GPU 48 may then process the polygons that make up the scene, which are generally referred to herein as triangles, although GPU 48 may implement a variety of other polygons to render a scene. GPU 48 also determines which triangles are visible and generates a visibility stream. GPU 48 may use the visibility stream to identify visible triangles and skip invisible or covered triangles during tile-based rendering passes.

After binning, the GPU 48 may separately render each of the tiles by performing a rendering pass on each of the tiles. According to some aspects of the disclosure, GPU 48 may transfer data associated with a tile that is currently being rendered from an external memory, such as memory 32, to local GPU memory 52. The GPU 48 may also implement the visibility stream to prevent polygons that are not visible in the final scene from being rendered. The rendering pass of the tiles may include in three stages: (1) clear/unresolve, (2) rendering, and (3) resolve.

When rendering a tile, GPU 48 may initially prepare GPU memory 52 for processing by removing the contents of GPU memory 52 ("clear"), or reading values into GPU memory 52 from an external memory, such as memory 32 ("unresolve"). The GPU 48 may unresolve GPU memory 52 when preserving pixel data between tiles. During rendering, GPU 48 may generate and fill the triangles signaled in the visibility stream. For example, GPU 48 may generate the appropriate pixel values during the rendering so that the tile accurately represents a portion of the final scene. After rendering, GPU 48 may resolve the current tile by copying the contents from GPU memory 52 to memory 32. In some examples, GPU 48 may wait to resolve a tile until the GPU 48 has finished rendering the entire tile. The GPU 48 repeats the rendering process on a tile-by-tile basis until the entire scene is finished.

Figure 2:
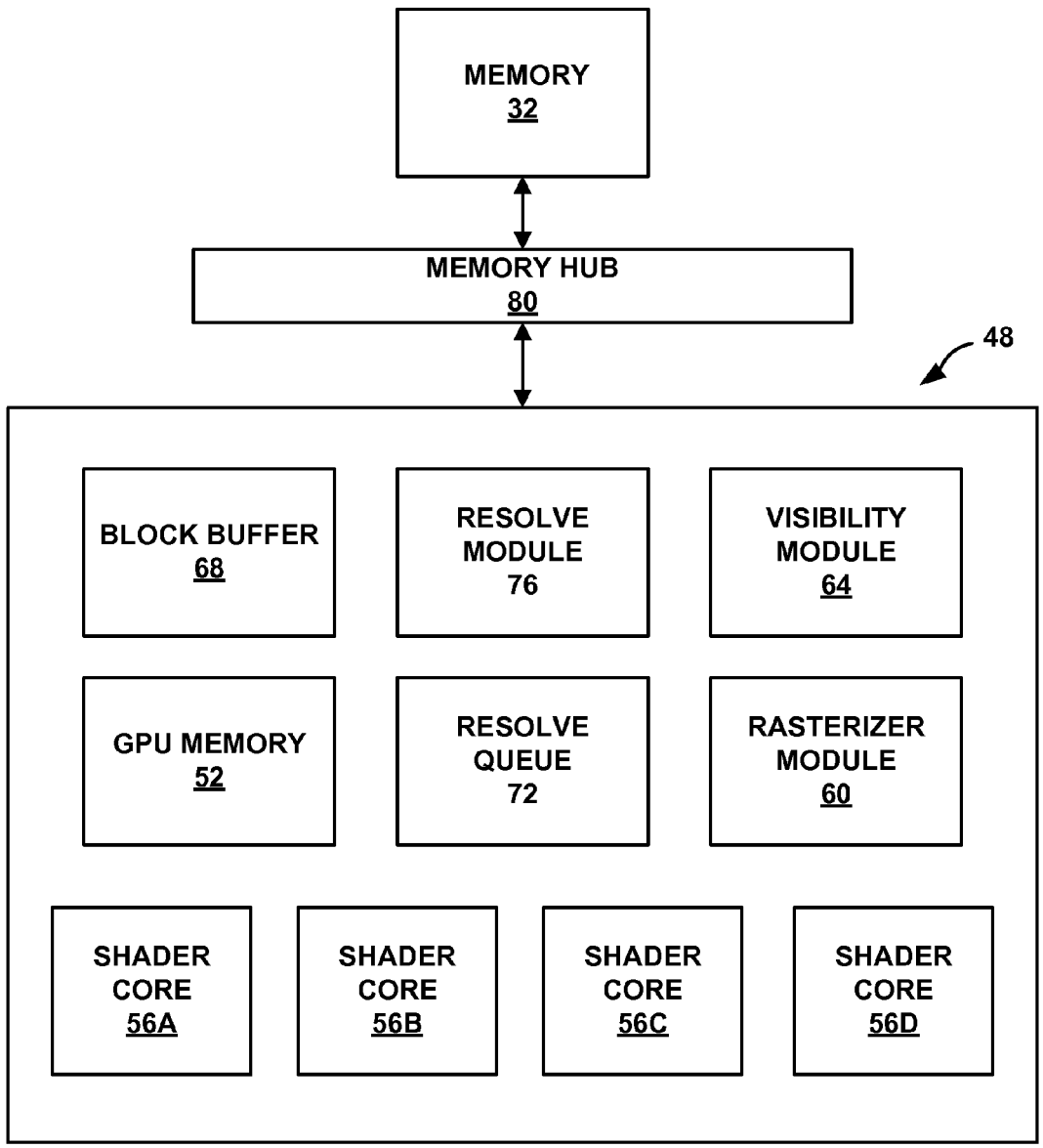
FIG. 2 is a block diagram illustrating the GPU shown in FIG. 1 in greater detail, according to aspects of the disclosure.

As described in greater detail with respect to FIG. 2, GPU 48 may interleave, or perform concurrently, certain processes associated with rendering tiles. For example, GPU 48 may concurrently render pixel data of a tile while also resolving other pixel data of the tile to memory 32. That is, GPU 48 may resolve some pixel data associated with a tile to memory 32 without waiting to render the entire tile. Additionally or alternatively, techniques of the disclosure include concurrently unresolving or clearing data associated with a particular tile from GPU memory 52 while rendering other data associated with the tile. That is, GPU 48 may concurrently render pixel data of a tile while also clearing or unresolving pixel data of the tile that has already been rendered and resolved. In this way, GPU 48 can clear or unresolve pixel data of a tile that has already been rendered and resolved, but that is still stored in GPU memory 52, in preparation for another tile while the GPU 48 finishes rendering a current tile. Additionally or alternatively, techniques of the disclosure include performing a subset the rendering steps described above (e.g., clear/unresolve, render, resolve). That is, certain aspects of the disclosure relate to skipping the clear/unresolve portion of the rendering process to improve the efficiency of GPU 48. Certain aspects of the disclosure may also relate to refraining from rendering certain pixel data to improve the efficiency of GPU 48.

FIG. 2 is a block diagram illustrating GPU 48 in greater detail, which may be implemented to carry out techniques for interleaving functions of the GPU 48. In the example shown in FIG. 2, GPU 48 includes a dedicated memory 52, four shader cores 56A-56D (collectively, shader cores 56), a rasterizer module 60, a visibility stream module 64, a block buffer 68, a resolve queue 72, and a resolve module 76. In addition, according to the example shown in FIG. 2, GPU 48 communicates with external memory 32 via memory hub 80. It should be understood that certain modules of FIG. 2 may be highly integrated, but are illustrated separately for conceptual purposes. Moreover, the certain modules may be described with respect to a single module for conceptual purposes, but may include one or more functional units.

FIG. 2 is provided as merely one example of a GPU that can utilize techniques for interleaving graphics processing functions. Techniques for interleaving graphics processing functions may be carried out by a variety of other GPUs having other components. For example, in other examples, GPU 48 may also include a variety of other components and modules related to analyzing and rendering images, such as an input assembly module, texture units, scheduling units, arithmetic logic units (ALUs), or other GPU components. In addition, GPU 48 may include more or fewer components than those shown in FIG. 2. For example, GPU 48 is shown in FIG. 2 as including four shader cores 56A-56D. In other examples, however, GPU 48 may include more or fewer shader cores 56 than those shown in FIG. 2.

In some examples, GPU memory 52 is similar to memory 32 shown in FIG. 1. For example, GPU memory 52 may be a temporary computer-readable storage medium. Examples of GPU memory 52 include random access memories (RAM), dynamic random access memories (DRAM), static random access memories (SRAM), and other forms of registers and memories known in the art. In examples where GPU 48 is formed as part of another processor, such as host processor 24 shown in FIG. 1, GPU memory 52 may be accessed by components other than GPU 48.

In some examples, components of GPU 48 may access GPU memory 52 with relatively lower latency than the components of GPU 48 may access an external memory, such as memory 32. For example, GPU memory 52 may be an on-chip memory that is in relatively close proximity with GPU components, and may be associated with a dedicated memory buss within GPU 48. To access data stored in external memory 32, however, GPU 48 may have to share memory hub 80 with other computing device components, thereby reducing the available bandwidth.

To take advantage of the high bandwidth, low latency GPU memory 52, GPU 48 may render graphics using a tile-based rendering architecture. GPU 48 may break a scene (e.g., a display screen) into smaller portions (e.g., tiles), and GPU memory 52 may store data associated with a tile of a scene while GPU 48 renders the tile. For example, after dividing a scene into tiles, GPU 48 may transfer a tile of pixel data from an external memory, such as memory 32 to GPU memory 52 via memory hub 80. GPU 48 may then render the tile. After rending the tile, GPU 48 may resolve, or copy, the rendered pixel data from GPU memory 52 to memory 32 via memory hub 80.

According to some aspects of the disclosure, shader cores 56 are configured as "common shader cores," and are responsible for vertex, geometry, and pixel related shader operations of GPU 48. For example, shader cores 56 may be responsible for determining vertex positions of polygons (e.g., triangles) that make up a scene and producing a triangle mesh of the scene. In addition, shader cores 56 may be responsible for generating primitives from the triangle mesh, as well as pixel filling and shading operations. Shader cores 56 may be configured identically, or may be individually configured to perform a specific task. For example, shader core 56A may be configured as a "binning shader" that is responsible for binning operations, while shader cores 56B-56D may be responsible for other vertex, geometry, or pixel related operations.

Rasterizer 60 may receive vertex information from memory or visibility module 64, described below, and may generate a representation of triangles of a scene. In some examples, rasterizer 60 applies predefined rules to received vertex information to determine which triangles are visible in the final scene. Rasterizer 60 may cull, or remove, any invisible triangles of the scene. For example, rasterizer 60 may perform z-buffering to remove triangles that are covered by other triangles, and therefore not visible in the final scene. According to some aspects of the disclosure, rasterizer 60 may perform rasterization and triangle culling on a block-by-block basis. For example, rasterizer 60 may group pixels into "blocks" of pixel data (e.g., a 4×4 block of pixels, an 8×8 block of pixels, a 16×16 block of pixels, and the like) and perform rasterization and triangle culling on a low resolution basis.

Visibility module 64 may receive the rasterized data from rasterizer module 60 and generate one or more visibility streams. To generate the visibility stream, visibility module 64 may distribute each of the visible triangles, as determined by rasterizer 60, to bins. Each bin may represent a tile of the finished scene. In some examples, visibility module 64 may generate a separate visibility stream for each of the bins. For example, visibility module 64 may generate a visibility stream for a particular bin by setting flags to indicate which triangles of the particular bin are visible and which triangles of the particular are invisible. According to some aspects, visibility module 64 may set a flag value of "1" to indicate that a triangle is visible in the final scene and a flag value of "0" to indicate that a triangle is not visible in the final scene. Accordingly, visibility module 64 may generate a plurality of visibility streams comprising flags that indicate the visible triangles of each of the bins. In some examples, visibility module 64 may compress the visibility streams. For example, visibility module 64 may apply a compression scheme to reduce large strings of "0" flags and reduce the amount of memory required to restore the visibility streams.

According to some aspects of the disclosure, in addition to generating the visibility streams, visibility module 64 may also perform triangle indexing. For example, in addition to determining which triangles are visible in each of the bins and generating the visibility streams, techniques of the disclosure include assigning an index number to each of the visible triangles of a scene during binning Visibility module 64 may assign triangle index values to the visible triangles of a particular tile according to an order in which rasterizer module 60 rasterizes the visible triangles. Assigning the index values in this way results in triangles having temporally relative index values. For example, GPU 48 may render the triangles in the same order in which rasterizer module 60 rasterizes the triangles. Accordingly, a triangle having a relatively lower index value indicates that the triangle is rasterized and rendered before triangles having relatively higher index values.

Block buffer 68 may include registers or other memory for storing triangle index values. According to some aspects of the disclosure, each entry of block buffer 68 may correspond to a blocks of pixels of a tile (e.g., a 4×4 block, a 8×8 block, a 16×16 block, and the like). For example, block buffer 68 may include a plurality of entries that correspond to each of the blocks of pixels that were rasterized by rasterizer module 60. In some examples, block buffer 68 may be represented as a table of triangle index values, with each entry in the table corresponding to a spatial location of a block in the tile (e.g., as shown and described in greater detail with respect to FIG. 5). According to some examples, the triangle index values stored to the block buffer 68 may be referred to as a "block index values," where the block index values are equivalent to the triangle index values.

Visibility module 64 may be responsible for storing triangle index values to block buffer 68. In some examples, visibility module 64 may store a triangle index value of the last triangle to be rendered in a particular block to that block's position in block buffer 68. As described above, the highest triangle index value associated with a particular block relates to the last triangle that is rendered in that block. Accordingly, visibility module 64 may identify and store the highest index value associated with a triangle of a particular block to that block's position in block buffer 68. Although represented as an independent buffer in FIG. 2, according to some examples, block buffer 68 may be integrated in another component of GPU 48. In one example, block buffer 68 may be included in visibility module 64. In another example, block buffer 68 may be a partition of GPU memory 52.

Resolve queue 72 may include registers or other memory for storing block identifiers that correspond to the spatial location of blocks in a tile. In one example, each block of a tile may be identifiable by its 2-D coordinate, e.g., (x, y) in Cartesian coordinates. For example, the block located at the top-left corner of the tile may be identified as the block located at (0, 0). The block immediately to the right of the block located at (0, 0) may be identified as the block located at (1, 0). The block immediately below the block located at (0, 0) may be identified as the block located at (0, 1). The Cartesian coordinates described above are used for described for illustration purposes only, and the positions of the blocks may be identifiable in other ways with other coordinate systems (e.g., polar coordinates, bipolar coordinates, parabolic coordinates, and the like).

According to some aspects of the disclosure, the resolve queue 72 holds the block identifiers of blocks that are ready to be resolved. For example, resolve queue 72 may hold the block identifiers of blocks that have been rendered by GPU 48 (e.g., using shader cores 56) and are ready to be resolved to memory 32 via memory hub 80. Resolve queue 72 may be sized to store all of the block identifiers of a given tile. In some examples, the resolve queue 72 may be a first-in-first-out ("FIFO") type buffer, such that the first block identifier received by the resolve queue 72 is also the first to be read from the resolve queue 72.

Resolve module 76 may read the block identifier values stored in resolve queue 72 and resolve blocks of pixels according to the order of the block identifiers stored in resolve queue 72. For example, resolve module 76 may read a particular block identifier stored in resolve queue 72 and copy the rendered block of pixel data from GPU memory 52 to memory 32 via memory hub 80. Resolve module 76 may operate asynchronously from the rendering process. For example, the resolve module 76 can read block index values stored in the resolve queue 72 and resolve blocks of pixel data at any time, including during rendering.

Aspects of the disclosure relate to interleaving rendering and resolve processes of GPU 48. In some examples, GPU 48 may initially receive a command from an external source, such as host processor 24 shown in FIG. 1, to render a scene for display. GPU 48 may begin by processing the entire scene during a binning pass. For example, GPU 48 may implement one or more of the shader cores 56 to generate vertex information, and implement rasterizer module 60 to transform the vertex information into triangles of the scene. Rasterizer 60 may also determine which triangles of the scene are visible. In some examples, rasterizer 60 may perform rasterization and cull triangles that are not visible in the final scene.

Visibility module 64 may receive the rasterized data and distribute each of the visible triangles to bins (e.g., each bin represents a tile of the scene). Visibility module 64 may generate a separate visibility stream for each of the bins by setting flags to indicate which triangles of the particular bin are visible. To enable interleaving of rendering and resolve processes, visibility module 64 may also perform triangle indexing. For example, visibility module 64 may assign triangle index values to the visible triangles of a particular tile according to an order in which rasterizer module 60 rasterizes the visible triangles.

According to some aspects of the disclosure, visibility module 64 may also be responsible for associating triangle index values with blocks of pixels and storing the triangle index values to block buffer 68. For example, each time visibility module 64 processes a triangle, visibility module 64 may determine which block or blocks that the triangle "touches" (e.g., which blocks will be used to display the triangle in the final scene). Visibility module 64 may associate the triangle index value of the triangle currently being processed with each block that the triangle touches, and store those associations to the appropriate locations in block buffer 68. According to some examples, visibility module 64 may overwrite the triangle index values stored in block buffer 68 as visibility module 64 processes each triangle. For example, if a new triangle touches the same block as a previously processed triangle, visibility module 64 may associate the triangle index value of the new triangle with the block. Visibility module 64 may also overwrite the corresponding position in block buffer 68 with the new triangle index value. In this way, visibility module 64 can store the triangle index value for a last triangle that is processed in a particular block to that block's associated position in block buffer 68.

After GPU 48 has completed binning the entire scene, GPU 48 may render each tile of visible triangles separately during a plurality of rendering passes. During each of the rendering passes, GPU 48 may perform three processes to finish the tiles: (1) clear/unresolve, (2) render, and (3) resolve. Aspects of the disclosure relate to interleaving the rendering and resolve processes. For example, GPU 48 may perform the rendering and resolve processes simultaneously, and without waiting for an entire tile render before resolving the tile.

GPU 48 may interleave the rendering and resolve processes by utilizing the triangle index values stored in block buffer 68. During a rendering pass of a tile, GPU 48 may initially prepare GPU memory 52 for the tile by clearing (e.g., erasing) or unresolving (e.g., overwriting) the contents of GPU memory 52. Rasterizer module 60 may then generate the visible triangles of the tile using the visibility stream stored in visibility module 64. In addition, rasterizer module 60 may maintain a rolling counter associated with each triangle that is generated. For example, rasterizer module 60 may increment a counter each time that rasterizer module 60 generates a triangle.

According to some aspects of the disclosure, when generating triangles, the rasterizer module 60 also compares the triangle counter value with the triangle index values stored in block buffer 68 for each block of pixels that the triangle touches. That is, if rasterizer module 60 generates a triangle that spans three blocks (e.g., the triangle is displayed in three different blocks of pixels in the tile), rasterizer module 60 compares the triangle counter value to each of the triangle index values stored for each of the three blocks. Rasterizer module 60 may determine that a particular block will be ready to be resolved (e.g., after pixel shading and filling operations performed by shader cores 56) if the triangle counter value matches the stored triangle index value. For example, rasterizer module 60 may determine that no additional pixel data will be rendered to the block after the current triangle has been rendered, because the current triangle is the last triangle that contributes to the block.

If rasterizer module 60 determines that a block is ready to be resolved after the block has finished rendering (e.g., the counter value of the current triangle matches a triangle index value stored in block buffer 68 for the block), the rasterizer module 60 may store a block identifier value associated with the block to resolve queue 72. In some examples, the rasterizer 60 may also generate a resolve event (e.g., a flag or other event) that is associated with the block. The resolve event may be sent to the resolve module 76 through the remaining rendering stages (e.g., graphics pipeline operations such as pixel shading and filling operations).

By sending the resolve event through the remaining rendering stages, GPU 48 is able to finish rendering the current triangle before the event is received by resolve module 76. For example, the resolve module 76 may be positioned at the relative end of a rendering pipeline of GPU 48. If the resolve event follows the current triangle through the rendering stages of GPU 48, the triangle will finish rendering before the resolve module 76 receives the event. After receiving the resolve event, resolve module 76 may read the block identifier from resolve queue and resolve the block to external memory 32 via memory hub 80.

In this way, GPU 48 may interleave the rendering and resolve processes such that GPU 48 can render portions of a tile while simultaneously resolving other portions of the tile. For example, instead of waiting for an entire tile to finish rendering before resolving the tile, GPU 48 can identify smaller portions of a tile, i.e., one or more pixels (e.g., blocks), that are ready to be resolved. According to some aspects of the disclosure, prior to rendering, GPU 48 can store an index value for each block of pixels in a tile. The stored index value identifies the last triangle that will be rendered in each respective block. During rendering, GPU 48 can identify when a portion of a tile (e.g., a block of pixels) will be ready to be resolved by comparing a rolling counter value for a triangle that is currently being rendered to the stored index values for each block that the triangle touches. If the counter value of the triangle that is currently being rendered matches a stored index value, the block associated with that stored index values will be finished (e.g., ready for resolve) when the current triangle has finished rendering. Accordingly, GPU 48 can identify and resolve the blocks that are finished while still rendering the other blocks of the tile.

Resolving pixel data on a block-by-block basis, independently of the rendering process, may improve utilization of the shader cores 56. For example, interleaving the rendering and resolve processes may reduce large transfers of data between GPU memory 52 and external memory 32 when resolving an entire tile of data, during which time shader cores 56 sit idle. Instead, the shader cores 56 of GPU 48 may continue rendering pixel data of a tile, while at the same time resolving data of that tile to external memory 32.

In addition to interleaving the rendering and resolving processes, techniques of this disclosure relate to improving the unresolve/clear process. For example, after GPU 48 has resolved a block of pixel data to external memory 32, GPU 48 can immediately replace the resolved block of pixel data with new data. According to some aspects of the disclosure, upon resolving a block of pixel data in GPU memory 52, GPU 48 replaces the block of pixel data in GPU 52 by clearing or unresolving the block of pixel data from GPU memory 52. In this way the GPU 48 may replace the block (e.g., via clear/unresolve) while continuing to render other blocks of data in the same tile.

Interleaving the rendering process with the unresolve/clear process may further improve utilization of the shader cores 56. For example, interleaving the rendering and unresolve/clear process may reduce large transfers of data between GPU memory 52 and external memory when starting to perform binning on a new tile. That is, rather than having to clear/ unresolve an entire tile after resolving the tile, the GPU 48 can clear/unresolve portions of the tile while continuing to render other portions of the tile.

According to some aspects of the disclosure, to enable a partial clear/unresolve of a tile, GPU 48 may store an additional triangle index value. For example, GPU 48 may store a second triangle index value for a final triangle that touches a block that also fully covers the block to block buffer 68. For example, GPU 48 may generate a triangle index value in the same manner as that described above, but may only store a second triangle index value to block buffer 68 if the triangle is the final triangle rendered in a particular block and the triangle also fully covers the block (e.g., pixels from other triangles rendered later than this triangle in the same rendering pass do not contribute to the block).

In some examples, the final triangle that touches the block and fully covers the block must also have certain properties to ensure that no other information from other triangles contribute to the block. For example, such properties may include that there is no blending with other triangles, that there is no alpha kill associated with the triangle, that the triangle is opaque, and the like. If the triangle is the final triangle to touch a block, fully covers the block, and exhibits the predetermined properties, GPU 48 may store a second triangle index value for the triangle to block buffer 68.

The second triangle index value may aid GPU 48 in identifying blocks that do not need to be cleared/unresolved during the rendering process. For example, as noted above, GPU 48 may initially clear or unresolve the contents of GPU memory 52 during a rendering pass. Prior to unresolving the contents of GPU memory 52, however, GPU 48 may compare a triangle index value of a triangle currently being rendered to the second triangle index value in block buffer 68. If the index value of the current triangle is less than the second triangle index value (e.g., if a second triangle index value has been stored), GPU 48 may determine that the current triangle will be overwritten later. That is, GPU 48 may identify that there is a triangle that fully covers the block and that is rendered later in the rendering pass (e.g., and thus, has a higher triangle index value) that will eliminate/overwrite any contribution from the current triangle. Accordingly, GPU 48 may not clear/unresolve the block. That is, GPU 48 may only unresolve blocks that do not have a triangle that fully covers the block, but that still have triangles that touch the blocks.

In some examples, GPU 48 may refrain from rendering certain triangles based on the second triangle index value. For example, GPU 48 may refrain from rendering triangles that will be overwritten later during the rendering pass. That is, based on a second triangle index value, GPU 48 may refrain from rendering triangles associated with a lower index value than the second triangle index value. GPU 48 may refrain from rendering such triangles, because the triangle associated with the second index value will overwrite such triangles.

In this way, GPU 48 may identify the last triangle that is rendered in a block that fully overwrites all pixels in the block and may optimize the rendering pass accordingly. In an example, GPU 48 may not process some blocks at all. That is, if both the first triangle index value and the second triangle index values are zero, GPU 48 can determine that nothing is rendered to the block. Accordingly, there is no need to unresolve and resolve the block. In another example, when rendering a particular triangle, GPU 48 may not perform a clear/unresolve for the triangle if the triangle is fully covered by another triangle. That is, GPU 48 may use the second triangle index value, as described above, to determine when a block should be cleared/unresolved. Moreover, GPU 48 may use the second triangle index value to optimize rendering by reducing overdraw. That is, if GPU 48 identifies, prior to rendering a current triangle, that the current triangle will be overwritten by a triangle that fully covers the block later in the rendering pass (e.g., as identified by the second triangle index value), GPU 48 may refrain from rendering the current triangle.

The functions attributed to certain modules described with respect to FIG. 2 are provided merely for purposes of example. According to aspects of the disclosure, functions attributed to one module may be carried out by, or in cooperation with, another module of GPU 48. For example, the visibility module 64 is described above as generating associations between blocks of pixels and triangle index values. In other examples, rasterizer module 60 may be implemented to perform the associations.

Figure 3:
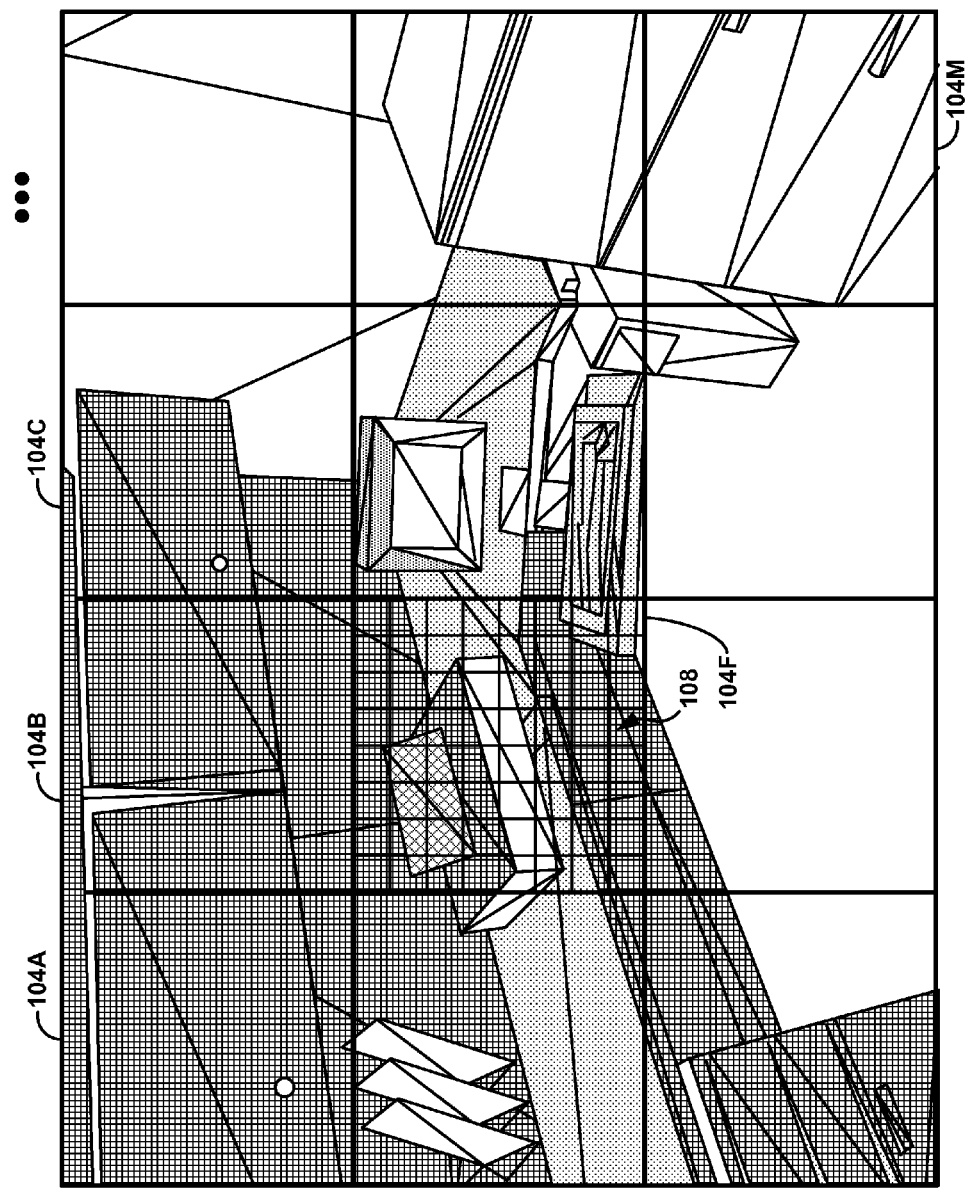
FIG. 3 is a block diagram illustrating a scene that is divided into a plurality of bins, with one bin divided into a plurality of blocks, according to aspects of the disclosure.

FIG. 3 is a block diagram illustrating a scene 100 that is divided into a plurality of bins 104A-104M (collectively, bins 104), with bin 104F divided into a plurality of blocks 108. Each of the bins 104 may be individually rendered by GPU 48, and may be referred to as a tile. According to some aspects of the disclosure, a GPU, such as GPU 48 shown in FIG. 1 and FIG. 2, may implement techniques to interleave GPU processes while rendering scene 100. For purposes of illustration only, FIG. 3 is described with respect to the example GPU 48 shown in FIGS. 1 and 2.

The scene 100 shown in FIG. 3 is a two dimensional representation of a three dimensional work space having a desk and a computer. Each component of the scene 100 may be represented with a plurality of triangles. The visible triangles of the scene 100 are shown in FIG. 3. In some examples, GPU 48 may be implemented to generate and fill the pixels that make up each of the triangles of scene 100.

According to some aspects of the disclosure, GPU 48 may perform a binning pass on scene 100. During the binning pass, GPU 48 may identify visible triangles of the scene 100 and sort the visible triangles to bins 104. In addition, to enable interleaving of GPU processes, GPU 48 may also perform triangle indexing. For example, as described in greater detail with respect to FIG. 4, GPU 48 may assign triangle index values to the visible triangles of the bins 104 according to an order in which the triangles of a bin 104 will be rendered. As described in greater detail with respect to FIG. 5, GPU 48 may also identify and store the highest triangle index value touching a block 108 to that block's position in block buffer 68. In this way, GPU 48 can store the triangle index value of the last triangle to be rendered in a particular block 108 to that block's position in block buffer 68.

Figure 4:
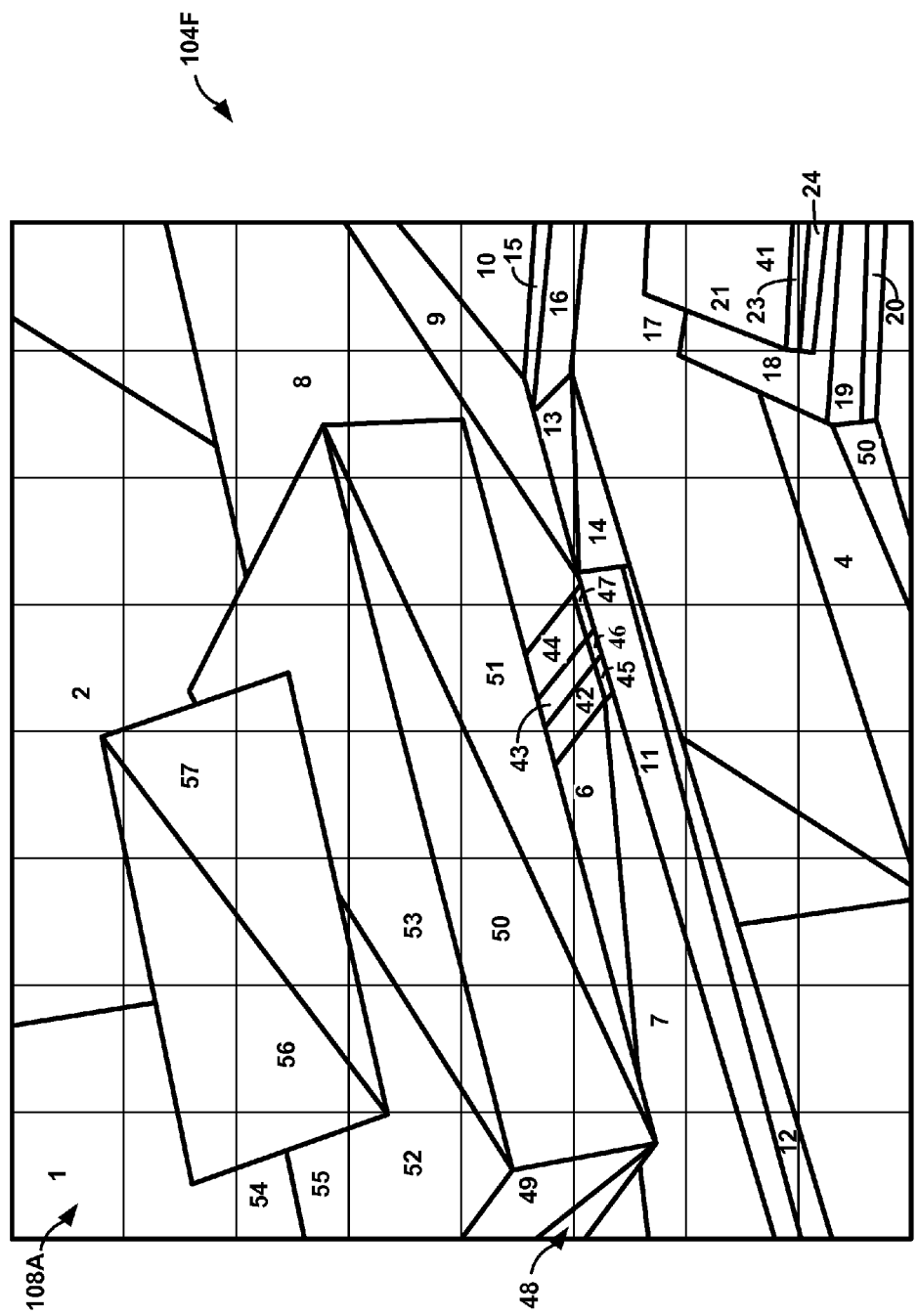
FIG. 4 is a block diagram illustrating triangle indexing of the bin having a plurality of blocks, as shown in FIG. 3, according to aspects of the disclosure.

FIG. 4 is a block diagram illustrating triangle indexing of the bin 104F shown in FIG. 3 that includes blocks 108. According to some aspects of the disclosure, a GPU, such as GPU 48 shown in FIG. 1 and FIG. 2, may implement the triangle indexing shown in FIG. 4 to interleave GPU processes while rendering the bin 104F of scene 100. For purposes of illustration only, FIG. 4 is described with respect to the example GPU 48 shown in FIGS. 1 and 2.

According to some aspects of the disclosure, GPU 48 may assign triangle index values to triangles of bin 104F based on an order in which the triangles will be rendered. For example, GPU 48 may generate triangle index values and assign the values to visible triangles of bin 104F during a rasterization process.

In some examples, GPU 48 may implement triangle indexing during a rasterization process that is carried out during both an initial binning process and again during a rendering process. For example, GPU 48 may generate triangle index values during the binning process when distributing visible triangles to bin 104F. In FIG. 4, each triangle includes an index value, such as index value 1 (e.g., with a portion of triangle 1 being covered by triangle 56). As described in greater detail with respect to FIG. 5, GPU 48 may also store the highest triangle index value touching a given block, such as block 108A shown in FIG. 4, to the given block's position in block buffer 68 during the binning process.

GPU 48 may also generate triangle index values for visible triangles of bin 104F using the visibility stream stored in visibility module 64 during rendering. For example, GPU 48 may maintain a rolling counter associated with each triangle that is generated during the rendering process for bin 104F. GPU 48 may increment the counter each time that a triangle is generated during rendering. According to some aspects of the disclosure, as described in greater detail with respect to FIGS. 5 and 7, the counter value may be compared to the index values stored in block buffer 68 to determine when a particular block 108, such as block 108A, is ready to be resolved.

FIG. 5 is a block diagram illustrating a table of index values 120 that are associated with the blocks of pixel data 108 show in FIGS. 3 and 4. According to some aspects of the disclosure, a GPU, such as GPU 48 shown in FIG. 1 and FIG. 2, may generate the table 120 shown in FIG. 5 to interleave GPU processes while rendering bin 104F shown in FIGS. 3 and 4. For purposes of illustration only, FIG. 5 is described with respect to the example GPU 48 shown in FIGS. 1 and 2.

According to aspects of the disclosure, the table of triangle index values 120 is one example of a table of triangle index values that may be stored in block buffer 68. In the example shown in FIG. 5, each entry of table 120 corresponds to a spatial location of a block 108 in bin 104F shown in FIG. 4. That is, the upper left hand entry of table 120, marked 0,0, may correspond to block 108A shown in FIG. 4. The remaining entries of table 120 may similarly correspond to the other blocks 108 of bin 104F.

GPU 48 may assign a triangle index value of the final triangle to be rendered in a particular block 108 to the corresponding location in table 120 (e.g., the last triangle to be rendered in time). The last triangle rendered in a particular block 108 is known, because the triangle index values are applied to the triangles according to the order in which the triangles will be rendered. For example, GPU 48 associates a triangle index value with one or more blocks each time that GPU 48 generates a triangle during rasterization. For example, GPU 48 determines the block or blocks in which a particular triangle is rendered in (e.g., which blocks the triangle "touches") and stores the triangle index value of that triangle to the corresponding locations in block buffer 68. If GPU 48 later generates another triangle that touches the same blocks as a previous triangle, GPU 48 can overwrite the corresponding locations in block buffer 68 with the new triangle index number. In this way, the GPU 48 stores the triangle index value of the last triangle to touch a particular block in the corresponding location of block buffer 68.

According to some examples, the triangle index values stored to the block buffer may be referred to as a "block index values," where the block index values are equivalent to the triangle index number of the last polygon that will be rendered in a block in time. According to aspects of the disclosure, the triangle index values stored in table 120 may be used during the rendering of bin 104F to aid in interleaving a rendering process and a resolve process. For example, GPU 48 may utilize the triangle index values stored in table 120 to determine when the corresponding blocks 108 will finish rendering. In some examples, GPU 48 may maintain a rolling counter for each triangle that is generated during a rendering phase, and compare the counter value of a current triangle to the entries of table 120 that the current triangle touches. If the counter value of the current triangle matches any of the relevant triangle index values stored in table 120, the corresponding blocks will be ready to be resolved after the current triangle has been rendered.

Upon matching the counter value and the triangle index values stored in table 120, GPU 48 may store a block identifier (e.g., such as the Cartesian coordinates described above) to resolve queue 72. As described in greater detail with respect to FIG. 6, the resolve queue 72 may be read by resolve module 76.

Figure 6:
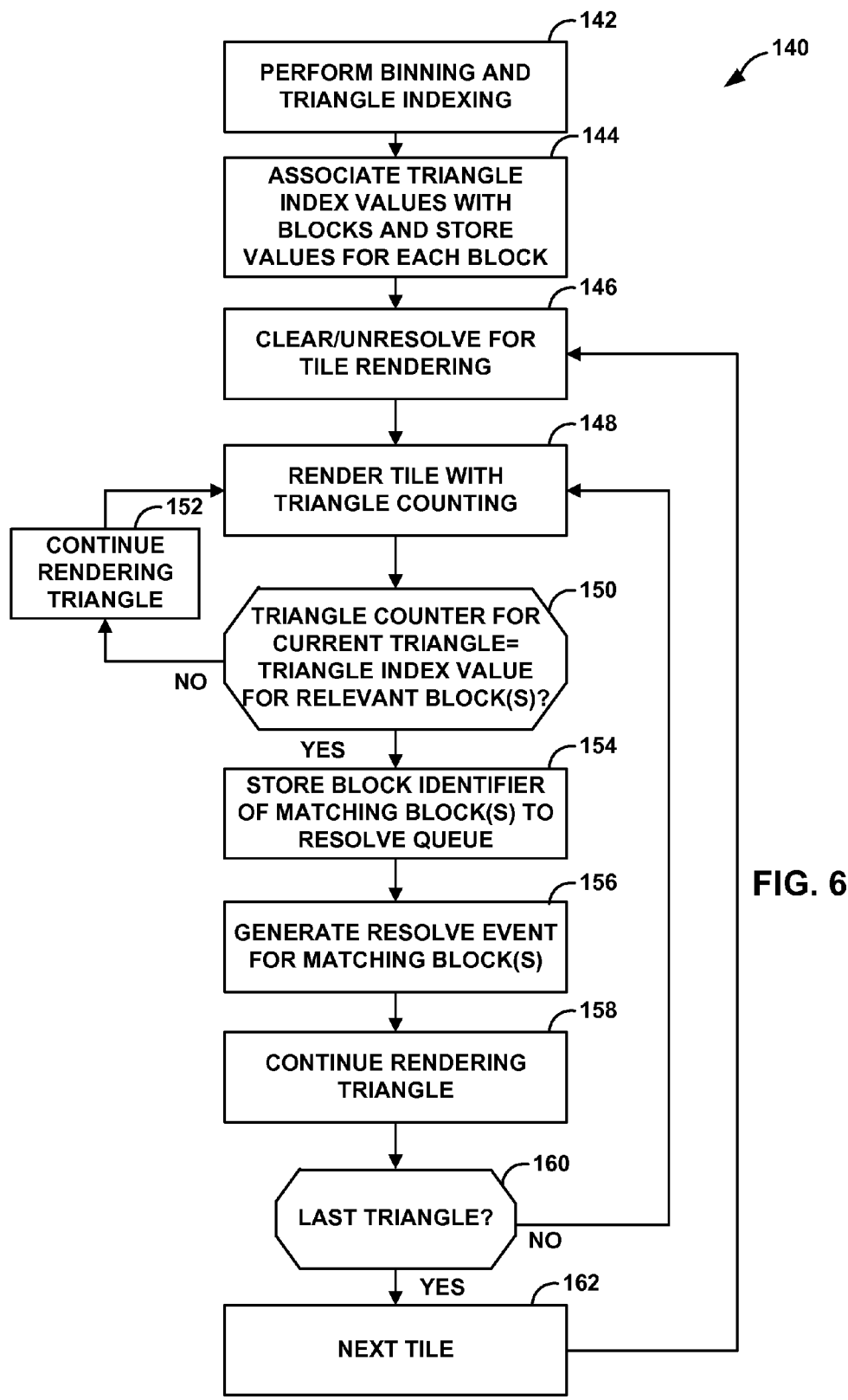
FIG. 6 is a flow chart illustrating a method of interleaving processes of a GPU, according to aspects of the disclosure.

FIG. 6 is a flow chart illustrating a method 140 of interleaving processes of a GPU, according to aspects of the disclosure. According to some aspects of the disclosure, a GPU, such as GPU 48 shown in FIG. 1 and FIG. 2, may perform the method 140. Accordingly, for purposes of illustration only, FIG. 6 is described with respect to the example GPU 48 shown in FIGS. 1 and 2.

According to the method 140, GPU 48 initially receives a scene of pixel data (e.g., from host processor 24 shown in FIG. 1) and performs binning and triangle indexing for the scene (142). For example, GPU 48 may generate the triangles that make up the scene, cull triangles that are not visible in the scene, and generate one or more visibility streams for each bin of the scene by distributing visible triangles to each bin. After distributing the triangles of the scene to bins, GPU 48 may also perform triangle indexing for each bin. That is, GPU 48 may generate a triangle index value for each triangle of each bin that indicates when a particular triangle will be rendered, relative to the other triangles of the bin.

According to aspects of the disclosure, GPU 48 also associates triangle index values with smaller portions of each bin, such as blocks of pixels (a 4×4 block, an 8×8 block, a 16×16 block, or the like), and stores the triangle index value of the final triangle to be rendered in a particular block to block buffer 68 (144). In some examples, GPU 48 associates a triangle index value with one or more blocks each time that GPU 48 generates a triangle. For example, GPU 48 determines which blocks that a particular triangle is rendered in (e.g., "touches") and stores the triangle index value of the triangle to the corresponding block locations in block buffer 68. If GPU 48 later renders another triangle that touches the same blocks, the corresponding block buffer values can be overwritten with the new triangle index number. In this way, the GPU 48 can store the triangle index value of the last triangle to touch a particular block in the corresponding location of block buffer 68.

After finishing the binning and storing triangle index values to block buffer 68, GPU may perform rendering on a first bin, also referred to as a tile. For example, GPU 48 may clear or unresolve GPU memory 52 (146). GPU 48 then begins rendering the tile by generating the visible triangles that make up the scene using a visibility stream from visibility module 76. In addition, GPU 48 maintains a rolling counter that is incremented for each triangle that is generated (146). Upon generating a triangle, GPU 48 may compare the counter value for the current triangle to the triangle index values stored in block buffer 68 for each block that the current triangle touches (150). If the counter value does not match the relevant triangle index values stored in block buffer 68, GPU 48 continues rendering the current triangle without taking further action (152). For example, each of the blocks that the current triangle touches will include information from triangles that are rendered later. GPU 48 then continues by generating the next tile and incrementing the counter value (148).

If the counter value does match any of the relevant triangle index values stored in block buffer 68, GPU 48 stores a block identifier of the matching blocks to resolve queue 72 (154).

For example, GPU 48 identifies the matching blocks and identifies those matching blocks using block identifiers that identify the spatial location of the matching blocks. Adding a block identifier to resolve queue 72 may indicate that the block is ready to be resolved after the current triangle has finished rendering.

In addition, GPU 48 may generate a resolve event (156) and continue rendering the current triangle (158). According to some examples, as described in greater detail with respect to FIG. 7, the resolve event may travel through the rendering pipeline with the current triangle and be received by resolve module 76. GPU 48 then determines whether the current triangle is the last triangle of the tile (160). If the current triangle is the last triangle of the tile, GPU 48 moves on to the next tile (162) and repeats the process at step 146. If the current triangle is not the last triangle of the tile, GPU 48 continues rendering at step 148.

Figure 7:
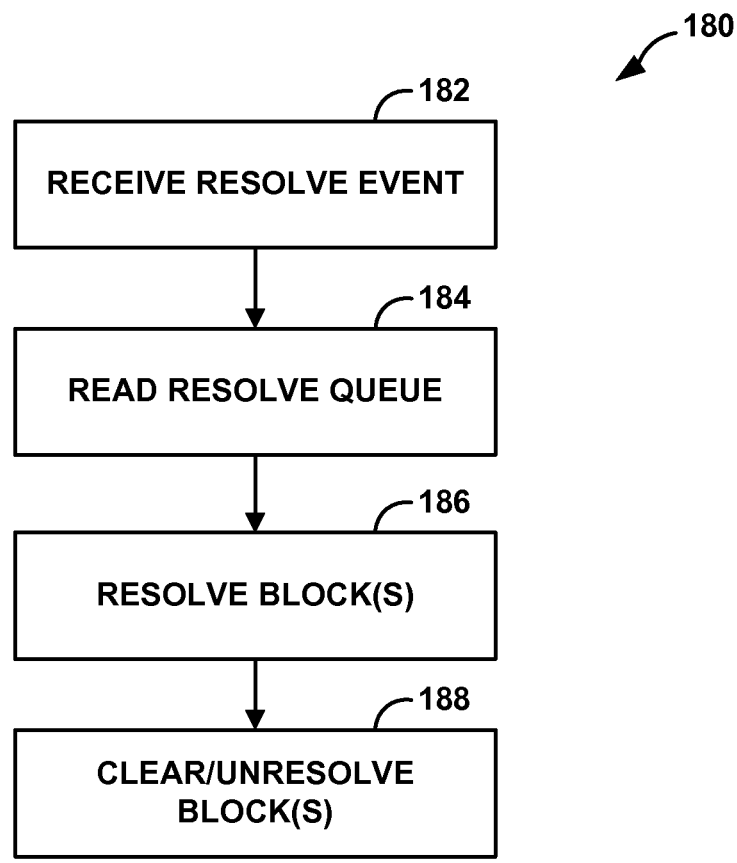
FIG. 7 is a flow chart illustrating another method of interleaving processes of a GPU, according to aspects of the disclosure.

FIG. 7 is a flow chart illustrating a method 180 of interleaving processes of a GPU, according to aspects of the disclosure. According to some aspects of the disclosure, a GPU, such as GPU 48 shown in FIG. 1 and FIG. 2, may perform the method 180. Accordingly, for purposes of illustration only, FIG. 7 is described with respect to the example GPU 48 shown in FIGS. 1 and 2.

As described with respect to FIG. 6, GPU 48 may generate resolve events at certain times during rendering. More specifically, GPU 48 may generate a resolve event when a counter value of a current triangle matches a triangle index value that is stored for a block that the current triangle touches. According to examples of the disclosure, resolve module 76 receives a resolve event (182). Upon receiving the resolve event, resolve module 76 may read a value from resolve queue 72 that identifies a block that is ready to be resovled (184). In some examples, the resolve queue 72 is a FIFO type register such that the first block identifier to be stored in resolve queue 72 is also the first to be read by resolve module 76.

After reading the resolve queue 72, resolve module 76 may read the block identified in the resolve queue 72 out from GPU memory 52 to external memory 32 (186). In addition, GPU 48 may clear or unresolve the block of pixel data that was just read out to external memory 32 with new data (188).

While certain aspects of this disclosure have been described with respect to "triangles," it should be understood, as noted above, that a number of other polygons may be used. That is, a GPU may implement the techniques described herein using any polygon, and the aspects of this disclosure are not limited to triangles.

In one or more examples, the functions described may be implemented in hardware, software executed on hardware, firmware executed on hardware, or any combination thereof. In some examples, instructions stored on a computer-readable media may cause the hardware components to perform their respective functions described above. The computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Combinations of the above should also be included within the scope of computer-readable media.

The code may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined by a collection of interoperative hardware units, including one or more processors as described above, in conjunction with suitable software and/or firmware.

Various examples have been described. These and other examples are within the scope of the following claims.

The invention claimed is:

1. A method of processing graphics, the method comprising:
   organizing graphics data into a plurality of polygons;
   assigning to each polygon of the plurality of polygons a polygon index value that indicates an order in which each polygon will be rendered;
   associating pixels of graphics data with one of the polygon index values;
   assigning each polygon of the plurality of polygons a counter value when rendering each polygon of the plurality of polygons to a first memory;
   resolving the pixels of graphics data based on a comparison of the polygon index value associated with the pixels and the counter value, wherein resolving the pixels of graphics data comprises copying the pixels of graphics data from the first memory to a second memory.

2. The method of claim 1, further comprising, upon resolving the pixels of graphics data, at least one of clearing or unresolving the pixels of graphics data stored in a memory.

3. The method of claim 1, further comprising generating a visibility stream that indicates which of the plurality of polygons are visible polygons, and wherein assigning to each polygon the polygon index value comprises assigning polygon index values to visible polygons.

4. The method of claim 1, wherein the rendering each polygon comprises rendering each polygon in a first rendering pass, the method further comprising:
   associating the pixels of graphics data with a second polygon index value;
   determining whether the pixels of graphics data will be overwritten during a second rendering pass following the first rendering pass based at least partially on the association of the pixels to the second polygon index value; and
   refraining from rendering the pixels of graphics data when the pixels of graphics data will be overwritten during the second rendering pass.

5. The method of claim 1, wherein associating the pixels of graphics data comprises grouping the pixels into a plurality of blocks and assigning each block of the plurality of blocks a respective one of a plurality of block index values based the polygon index value that is associated with a final polygon that will be rendered in each respective block, and wherein resolving the pixels based on the comparison comprises resolving each block based on a comparison of the respective one of the plurality of block index values and the counter value.

6. The method of claim 5, further comprising storing the block index values to a block buffer.

7. The method of claim 5, further comprising, upon matching the counter value to one of the block index values, storing a block identifier value that identifies the matching block index value to a resolve queue.

8. The method of claim 5, wherein each block of the plurality of blocks is at least one of four pixels by four pixels in size, eight pixels by eight pixels in size, or 16 pixels by 16 pixels in size.

9. The method of claim 5, further comprising, prior to resolving each block based on the comparison and upon matching the counter value to one of the block index values, generating a resolve event that indicates that a block associated with the matching block index value is ready to be resolved upon completing rendering of the polygon associated with the matching counter value.

10. The method of claim 9, wherein resolving the pixels further comprises:
   receiving the resolve event and identifying the block associated with the matching block index value, and
   resolving the block associated with the matching block index value based on the resolve event.

11. An apparatus for processing graphics, the apparatus comprising one or more processors configured to:
   organize graphics data into a plurality of polygons;
   assign to each polygon of the plurality of polygons a polygon index value that indicates an order in which each polygon will be rendered;
   assign each polygon of the plurality of polygons a counter value when rendering each polygon of the plurality of polygons to a first memory;
   resolve the pixels of graphics data based on a comparison of the polygon index value associated with the pixels and the counter value, wherein resolving the pixels of graphics data comprises copying the pixels of graphics data from the first memory to a second memory.

12. The apparatus of claim 11, wherein the one or more processors are further configured to, upon resolving the pixels of graphics data, at least one of clear or unresolve the pixels of graphics data stored in a memory.

13. The apparatus of claim 11, wherein the one or more processors are further configured to generate a visibility stream that indicates which of the plurality of polygons are visible polygons, and wherein to assign to each polygon the polygon index value the one or more processors are configured to assign polygon index values to visible polygons.

14. The apparatus of claim 11, wherein the rendering each polygon comprises rendering each polygon in a first rendering pass, wherein the one or more processors are further configured to:
   associate the pixels of graphics data with a second polygon index value;
   determine whether the pixels of graphics data will be overwritten during a second rendering pass following the first rendering pass based at least partially on the association of the pixels to the second polygon index value; and
   refrain from rendering the pixels of graphics data when the pixels of graphics data will be overwritten during the second rendering pass.

15. The apparatus of claim 11, wherein to associate the pixels of graphics data, the one or more processors are configured to group the pixels into a plurality of blocks and assign each block of the plurality of blocks a respective one of a plurality of block index values based the polygon index value that is associated with a final polygon that will be rendered in each respective block, and wherein to resolve the pixels based on the comparison, the one or more processors are configured to resolve each block based on a comparison of the respective one of the plurality of block index values and the counter value.

16. The apparatus of claim 15, wherein the one or more processors are further configured to store the block index values to a block buffer.

17. The apparatus of claim 15, wherein the one or more processors are further configured to, upon matching the counter value to one of the block index values, store a block identifier value that identifies the matching block index value to a resolve queue.

18. The apparatus of claim 15, wherein each block of the plurality of blocks is at least one of four pixels by four pixels in size, eight pixels by eight pixels in size, or 16 pixels by 16 pixels in size.

19. The apparatus of claim 15, wherein the one or more processors are further configured to, prior to resolving each block based on the comparison and upon matching the counter value to one of the block index values, generate a resolve event that indicates that a block associated with the matching block index value is ready to be resolved upon completing rendering of the polygon associated with the matching counter value.

20. The apparatus of claim 19, wherein to resolve the pixels, the one or more processors are configured to receive the resolve event and identifying the block associated with the matching block index value and resolve the block associated with the matching block index value based on the resolve event.

21. A computer program product comprising a non-transitory computer-readable medium having stored thereon instructions that, when executed, cause one or more processors to:
   organize graphics data into a plurality of polygons;
   assign to each polygon of the plurality of polygons a polygon index value that indicates an order in which each polygon will be rendered;
   assign each polygon of the plurality of polygons a counter value when rendering each polygon of the plurality of polygons to a first memory;
   resolve the pixels of graphics data based on a comparison of the polygon index value associated with the pixels and the counter value, wherein resolving the pixels of graphics data comprises copying the pixels of graphics data from the first memory to a second memory.

22. The computer program product of claim 21, further comprising instructions that, when executed, cause one or more processors to, upon resolving the pixels of graphics data, at least one of clear or unresolve the pixels of graphics data stored in a memory.

23. The computer program product of claim 21, further comprising instructions that, when executed, cause the one or more processors to generate a visibility stream that indicates which of the plurality of polygons are visible polygons, and wherein to assign to each polygon the polygon index value, the instructions cause the one or more processors to assign polygon index values to visible polygons.

24. The computer program product of claim 21, wherein the rendering each polygon comprises rendering each polygon in a first rendering pass, further comprising instructions that, when executed, cause one or more processors to:
associate the pixels of graphics data with a second polygon index value;
determine whether the pixels of graphics data will be overwritten during a second rendering pass following the first rendering pass based at least partially on the association of the pixels to the second polygon index value; and
refrain from rendering the pixels of graphics data when the pixels of graphics data will be overwritten during the second rendering pass.

25. The computer program product of claim 21, wherein to associate the pixels of graphics data, the instructions cause the one or more processors to group the pixels into a plurality of blocks and assign each block of the plurality of blocks a respective one of a plurality of block index values based the polygon index value that is associated with a final polygon that will be rendered in each respective block, and wherein to resolve the pixels based on the comparison, the instructions cause the one or more processors to resolve each block based on a comparison of the respective one of the plurality of block index values and the counter value.

26. The computer program product of claim 25, further comprising instructions that, when executed, cause the one or more processors to store the block index values to a block buffer.

27. The computer program product of claim 25, further comprising instructions that, when executed, cause the one or more processors to, upon matching the counter value to one of the block index values, store a block identifier value that identifies the matching block index value to a resolve queue.

28. The computer program product of claim 25, wherein each block of the plurality of blocks is at least one of four pixels by four pixels in size, eight pixels by eight pixels in size, or 16 pixels by 16 pixels in size.

29. The computer program product of claim 25, further comprising instructions that, when executed, cause the one or more processors to, prior to resolving each block based on the comparison and upon matching the counter value to one of the block index values, generate a resolve event that indicates that a block associated with the matching block index value is ready to be resolved upon completing rendering of the polygon associated with the matching counter value.

30. The computer program product of claim 29, wherein to resolve the pixels, the instructions cause the one or more processors to receive the resolve event and identifying the block associated with the matching block index value and resolve the block associated with the matching block index value based on the resolve event.

31. A device for processing graphics, the device comprising:
means for organizing graphics data into a plurality of polygons;
means for assigning to each polygon of the plurality of polygons a polygon index value that indicates an order in which each polygon will be rendered;
means for associating pixels of graphics data with one of the polygon index values;
means for assigning each polygon of the plurality of polygons a counter value when rendering each polygon of the plurality of polygons to a first memory; and
means for resolving the pixels of graphics data based on a comparison of the polygon index value associated with the pixels and the counter value, wherein resolving the pixels of graphics data comprises copying the pixels of graphics data from the first memory to a second memory.

32. The device of claim 31, further comprising, upon resolving the pixels of graphics data, means for at least one of clearing or unresolving the pixels of graphics data stored in a memory.

33. The device of claim 31, further comprising means for generating a visibility stream that indicates which of the plurality of polygons are visible polygons, and wherein the means for assigning to each polygon the polygon index value comprises means for assigning polygon index values to visible polygons.

34. The device of claim 31, wherein the rendering each polygon comprises rendering each polygon in a first rendering pass, further comprising:
means for associating the pixels of graphics data with a second polygon index value;
means for determining whether the pixels of graphics data will be overwritten during a second rendering pass following the first rendering pass based at least partially on the association of the pixels to the second polygon index value; and
means for refraining from rendering the pixels of graphics data when the pixels of graphics data will be overwritten during the second rendering pass.

35. The device of claim 31, wherein the means for associating the pixels of graphics data comprises means for associating the pixels into a plurality of blocks and assigning each block of the plurality of blocks a respective one of a plurality of block index values based the polygon index value that is associated with a final polygon that will be rendered in each respective block, and wherein resolving the pixels based on the comparison comprises resolving each block based on a comparison of the respective one of the plurality of block index values and the counter value.

36. The device of claim 35, further comprising means for storing the block index values to a block buffer.

37. The device of claim 35, further comprising, upon matching the counter value to one of the block index values, means for storing a block identifier value that identifies the matching block index value to a resolve queue.

38. The device of claim 35, wherein each block of the plurality of blocks is at least one of four pixels by four pixels in size, eight pixels by eight pixels in size, or 16 pixels by 16 pixels in size.

39. The device of claim 35, further comprising means for generating, prior to resolving each block based on the comparison and upon matching the counter value to one of the block index values, a resolve event that indicates that a block associated with the matching block index value is ready to be resolved upon completing rendering of the polygon associated with the matching counter value.

40. The device of claim 39, wherein resolving the pixels further comprises:
means for receiving the resolve event and identifying the block associated with the block index value, and
means for resolving the block associated with the matching block index value based on the resolve event.

* * * * *